Feb. 2, 1965    L. A. PETERMANN    3,168,623
PIEZOELECTRIC TRANSDUCER

Original Filed Oct. 13, 1954    7 Sheets-Sheet 4

INVENTOR.
LUCIEN A. PETERMANN
BY
Cyrus D. Samuelson
ATTORNEY

Feb. 2, 1965　　　　　L. A. PETERMANN　　　　　3,168,623
PIEZOELECTRIC TRANSDUCER

Original Filed Oct. 13, 1954　　　　　　　　　　　7 Sheets-Sheet 5

INVENTOR.
LUCIEN A. PETERMANN
BY
Cyrus D. Samuelson
ATTORNEY

United States Patent Office 3,168,623
Patented Feb. 2, 1965

3,168,623
PIEZOELECTRIC TRANSDUCER
Lucien A. Petermann, Geneva, Switzerland, assignor to Gulton Industries, Inc., Metuchen, N.J., a corporation of New Jersey
Original application Oct. 13, 1954, Ser. No. 461,979, now Patent No. 2,928,069, dated Mar. 8, 1960. Divided and this application Nov. 18, 1959, Ser. No. 853,931
31 Claims. (Cl. 179—100.41)

My invention relates to electro-mechanical transducers and their use. This is a division of my application Serial No. 461,979, filed October 13, 1954, now Patent No. 2,928,069.

An important object of my invention is to provide a transducer with a lower resonant frequency than other transducers of comparable dimensions.

A further object is to provide a more sensitive transducer than other transducers of comparable dimensions.

A still further object of my invention is to provide a transducer which may be produced more economically than other transducers.

A still further object of my invention is to provide a transducer which will accurately control the frequency of very low frequency oscillatory circuits.

A still further object of my invention is to provide a transducer whose resonant frequencies may be varied by adjustment.

A still further object of my invention is to provide a transducer which may be employed as the active element in a microphone.

A still further object of my invention is to provide a transducer which may be employed as the active element of a loudspeaker or tweeter.

A still further object of my invention is to provide a transducer which may be employed as the active element in a phonograph or transcription pickup.

A still further object of my invention is to provide a transducer which may be employed as the active element in a phonograph or transcription record cutter.

A still further object of my invention is to provide a transducer which may be employed as an electromechanical filter.

A still further object of my invention is to provide a transducer which may be employed as a relay.

A still further object of my invention is to provide a transducer which may be employed as the active element in a vibrator or chopper.

A still further object of my invention is to provide a transducer which may be employed as the active element in a hydrophone.

A still further object of my invention is to provide a transducer which may be employed as the active element in a subaqueous sound projector.

A still further object of my invention is to provide a transducer which may be employed as the active element in an accelerometer.

A still further object of my invention is to provide a transducer which may be employed as the active element in a displacement gauge.

A still further object of my invention is to provide a transducer which may be employed as the active element in a velocity gauge.

A still further object of my invention is to provide a transducer which may be employed as the active element in a sonic cleaning or chemical emulsification system.

Other objects and advantages of my invention will be apparent during the course of the following description.

In the accompanying drawings, forming a part of this application, and in which like numerals are employed to designate like parts throughout the same, FIGURES 5A, 5B, 5C, 5D and 5E illustrate driving field intensities in transducers of varying characteristics, FIGURE 6 serves to illustrate and explain the theory underlying my invention, FIGURES 6A and 6B illustrate homogeneous and non-homogeneous field distributions in magnetostrictive transducers, FIGURES 7A and 7B illustrate cross-sections of transducers, made of homogeneous material, and which may be driven electrically in flexural mode by applying the driving voltage on only two electrodes, FIGURES 7C and 7D illustrate cross-sections of transducers, made of homogeneous material, and which may not be driven electrically in flexural mode by applying the driving voltage on only two electrodes, FIGURES 31A and 31B are two possible embodiments of a section of the phonograph pickup of FIGURE 30 along the line 31—31 of FIGURE 30, FIGURE 49 illustrates a transducer, produced in accordance with my invention, employed as a chopper, FIGURE 50 is a plot of the voltage characteristic curve of the chopper of FIGURE 49, FIGURE 51 illustrates a transducer, produced in accordance with my invention, employed as a chopper, and FIGURE 52 is a plot of the voltage characteristic curve of the chopper of FIGURE 51.

Figure 1:
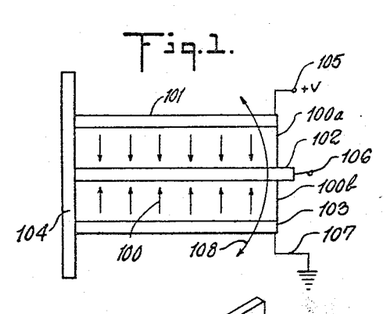
FIGURE 1 illustrates a method presently used to obtain motion of a flat transducer in flexural mode.

In the drawings, wherein for the purpose of illustration, are shown preferred embodiments of my invention, the numeral 100 designates a piezoelectric or polarized electrostrictive transducer with two portions 100a and 100b, both bonded to a center electrode 102. The outer surface of 100a is bonded to electrode 101 and the outer surface of 100b is bonded to electrode 103, such that there is good electrical contact between the portions 100a and 100b and the electrodes 101, 102 and 103. The combination is suitably affixed to a substantially rigid element 104. However, clamping of the transducer is not essential to its operation and there are many other mounting means which may be employed with equal effect. Terminals 105, 106, and 107 are electrically connected to electrodes 101, 102, and 103, respectively. If transducer 100 is polarized in the directions shown by the small arrows within 100a and 100b, flexural motion will be produced in 100 when voltage is applied bewteen terminals 105 and 107. If the polarization of 100a is in the same direction as that of 100b, flexure of transducer 100 may be obtained by electrically connecting terminals 105 and 107 and applying the voltage between their juncture and terminal 106. If the polarizations of 100a and 100b are as shown in FIGURE 1 and a direct current voltage is applied between terminals 105 and 107 as shown in the figure, transducer 100 will flex and remain in the flexed position after the voltage source is removed and until the charge leaks off. The direction of the initial flexure is determined by the polarity of the applied voltage and will be in one of the directions indicated by arrow 108. Conversely, under the above described conditions of polarization directions, a voltage will appear at the terminals designated for each condition of polarization and electrical connection when transducer 100 is subjected to an applied flexural mechanical force or moment in the direction of arrow 108.

Other methods for making the surfaces of the transducers of my invention electrically conductive, such as reducing the surface by chemical or other means, may be employed in lieu of bonding electrodes to the transducer's surfaces. Any method, which produces good electrical contact with the surface of the transducer, may be employed with transducers produced in accordance with my invention. References to electrodes throughout this specificaton also include conductive surface materials obtained by means other than deposition of metallic conductive material on the surface of the transducer.

Figure 2:
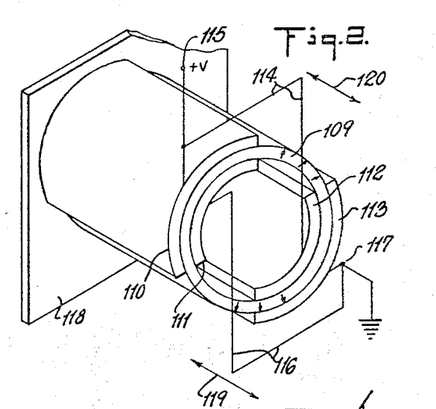
FIGURE 2 illustrates a method presently used to obtain motion of a cylindrical piezoelectric or polarized electrostrictive transducer in flexural mode.

The numeral 109 designates a cylindrical piezoelectric or polarized electrostrictive transducer with two pairs of electrodes, electrodes 110 and 111 being one such pair and electrodes 112 and 113 being the other pair. The numeral 114 designates the electrical connections from electrodes 110 and 112 to terminal 115 and the numeral 116 designates the electrical connections from electrodes 111 and 113 to terminal 117. Transducer 109 is suitably affixed to substantially rigid element 118. However, clamping of the transducer is not essential to its operation and there are many other mounting means which may be employed with equal effect. The polarization of transducer 109 is in the direction shown by the small arrows on transducer 109. Reversal of this polarization by 180 degrees will produce the same flexural results as herein described. If the alternating voltage is applied between terminals 115 and 117, transducer 109 will flex in the directions indicated by arrows 119 and 120. If a direct-current voltage is applied between terminals 115 and 117 as shown in the figure, transducer 109 will flex and remain in the flexed position after the voltage source is removed and until the charge leaks off. Conversely, under the above-described conditions of polarization direction, voltage will appear across terminals 115 and 117 when transducer 109 is subjected to an applied flexural mechanical force or moment in the directions of arrows 119 and 120.

Transducers 100 and 109 will flex at a rate determined by the frequency or time dependence of the alternating voltage applied to their respective electrical terminals. Conversely, the voltage appearing across said electrical terminals will be of the same frequency or time dependence as that of mechanical force or moment applied to the transducer.

Figure 3:
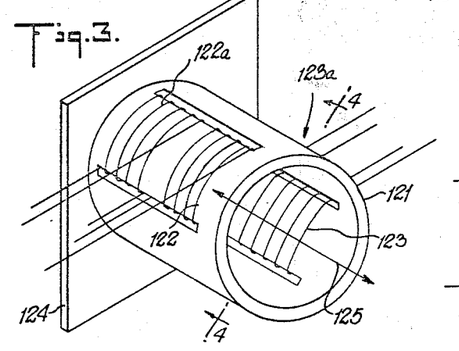
FIGURE 3 illustrates a method presently used to obtain motion of a magnetostrictive cylindrical transducer in flexural mode.
Figure 4:
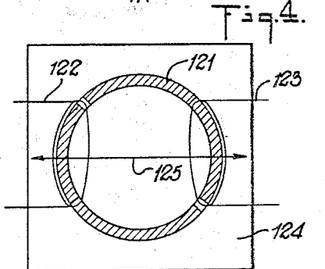
FIGURE 4 is a section of the transducer of FIGURE 3 along the line 4—4.

Cylindrical magnetostrictive transducer 121 is suitably affixed to substantially rigid element 124. However, clamping of the transducer is not essential to its operation and there are many other mounting means which may be employed with equal effect. Transducer 121 will flex in the directions indicated by arrow 125 when an alternating current flows thorugh opposed windings 122 and 123, provided there is a direct current flow through bias windings 122a and 123a. The time dependence of this flexure is determined by the frequency or time dependence of the flowing alternating current. Conversely, alternating currents will flow through opposed windings 122 and 123 if there is a direct current flow in bias windings 122a and 123a when transducer 121 is subjected to mechanical force or moment in the directions indicated by arrow 125. The frequency or time dependence of such current flow will be determined by that of the mechanical force or moment.

The flexural modes of a transducer of a given material, shape and dimensions are of lower resonant frequencies than those of the other modes and the methods illustrated in FIGURES 1, 2, 3, and 4 are those which are presently employed when it is necessary to make use of the lower resonant frequencies of the transducer.

Transducers produced according to my invention will vibrate in flexural mode, torsional mode or twisting mode. The torsional and twisting effects are obtained by utilizing the flexural motion of each elementary portion of specially shaped transducers and provide very low resonant frequencies of vibration for transducers of very small dimensions. In particular, transducers of the shapes and physical characteristics illustrated in FIGURES 33 through 36 and 48 will vibrate at the lowest possible resonant frequencies for a given outside dimension. For a given material and set of dimensions, transducers, produced according to my invention will vibrate at lower resonant frequencies than may be obtained by any other method.

The necessary and sufficient conditions for the production, by the use of electric or magnetic fields, of flexural vibration of a transducer composed of a completely homogeneous material and having only two driving electrodes or a single driving winding are: first, the applied (driving) dynamic field (electric or magnetic) in the cross-section of the transducer shall not be homogeneous (shall be non-homogeneous) over the entire cross-section; and second, the absolute instantaneous values of the field (electric or magnetic) at symmetrical points about the neutral axis shall not be equal. My invention directs itself to those transducers which meet these conditions.

The neutral line in a transducer is that line which does not change its length during flexure of the transducer. The neutral surface is the surface which contains the neutral line and is perpendicular to the direction of flexure. The intersection of the neutral surface with the cross-section of the transducer is the neutral axis.

Although there are many ways to obtain non-homogeneous dynamic fields in piezoelectric, polarized electrostrictive or magnetostrictive transducers, such as the use of more than two electrodes or a single driving winding, non-homogeneous material, and like methods, my invention teaches the obtaining of non-homogeneous dynamic fields by the correct and proper shaping of the transducer. Only two driving electrodes are required for a piezoelectric or polarized electrostrictive transducer and only a single driving winding is required for a magnetostrictive transducer.

Transducers shaped and produced in accordance with my invention will contain non-homogeneous dynamic driving fields even though the material comprising the transducer is homogeneous in all respects.

For the electric field, consider the law of the conservation of flux. We have div E equal to $kp$; where $p$ is the density of charge, $k$ is a constant, and E is the electric field. Further, the field is always perpendicular to an equipotential surface. The electrodes of the transducer are equipotential surfaces as long as they are much smaller in size than the wavelength of the applied alternating voltage. For the usual sizes of transducers with electrodes of less than 100 cm. between any two points thereon and applied frequencies of less than 15 megacycles, the electrodes are equipotential surfaces. When the electrodes are curved, the equipotential surfaces are curved and the applied (dynamic) driving field is no longer homogeneous.

For the magnetic field, consider the Ampere-Stokes theorem in conjunction with the expression (valid at low frequencies), curl B is equal to $kj$; where B is the magnetic induction, $k$ is a constant and $j$ is the current density. Transducer 437, shown in FIGURE 6B, contains enclosed area A. Disregarding eddy currents, which may be reduced considerably by conventional methods, there is no current flow anywhere in transducer 437 and consequently, there is no current flow in area A. The dynamic driving field is produced by helical windings 438 which are evenly distributed along transducer 437. Curl B is equal to zero everywhere in 437 and within enclosed area A.

$$\int_{1-2-3-4} B ds = \iint_A \text{curl } B d\sigma = 0$$

Portions 2–3 and 4–1 of 437 are such that B$ds$ is equal to zero. (B perpendicular to $ds$.) We obtain $(1-2)B_1 - (3-4)B_2$ is equal to zero. From which, $B_1/B_2$ is equal to $3-4/1-2$; and if 3–4 is not equal to 1–2, then $B_1$ is not equal to $B_2$ and the field is non-homogeneous. FIGURE 6B is a longitudinal section of transducer 347.

FIGURE 6A shows a longitudinal section of magnetostrictive transducer 435 which is of homogeneous material. Longitudinal axis 435$a$ is a straight line and the cross-section of transducer 435 is symmetrical to some line perpendicular to 435$a$. In transducer 435, 3–4 is equal to 1–2 and, therefore, $B_1$ is equal to $B_2$ and the field in 435 is homogeneous.

Figures 5A, 5B, 5C, 6, 7A, 7B, 7C, 7D:
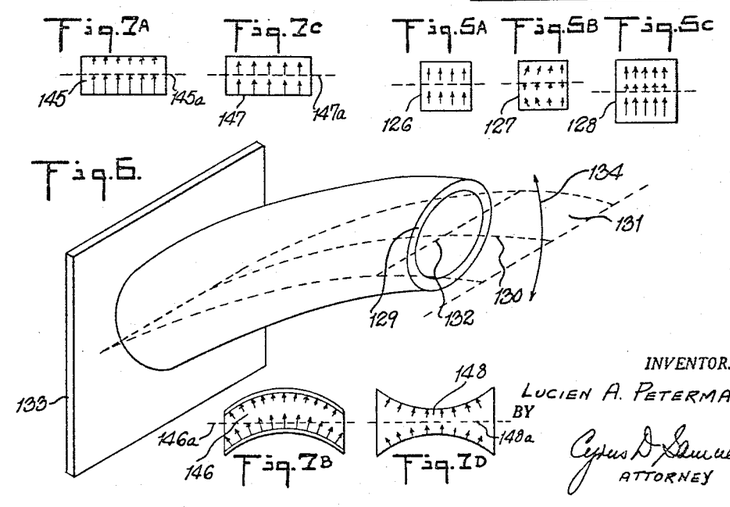

The driving dynamic instantaneous field 126 of FIGURE 5A is homogeneous and therefore, there will be no flexure, electro-mechanically produced, in a transducer of this cross-section and of homogeneous piezoelectric, polarized electrostrictive or magnetostrictive properties if only two driving electrodes or a single driving winding are used. The driving dynamic fields (instantaneous) 127 and 128 of FIGURES 5B and 5C are not homogeneous and if they are not symmetrical about the neutral axis of transducers of this cross-section and of homogeneous material and of homogeneous piezoelectric, polarized electrostrictive or magnetostrictive properties, the transducers can be excited in flexural vibration, by electro-mechanical means.

Figure 5D:
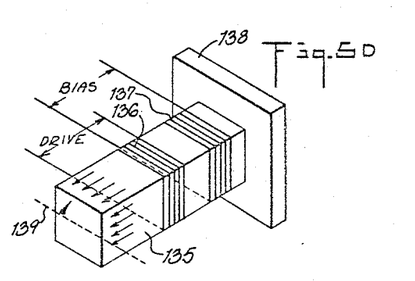

In FIGURE 5D, magnetostrictive transducer 135 is suitably affixed to substantially rigid body 138 and has windings 136 and 137 wound around the outside; 136 being the driving winding and 137 being the bias winding. The neutral axis is designated as 139 and the driving dynamic instantaneous field is as indicated by the arrows in the figure. Under these conditions transducer 135 will not vibrate in flexural mode if it is of homogeneous material.

Figures 5E, 49, 50, 51, 52:
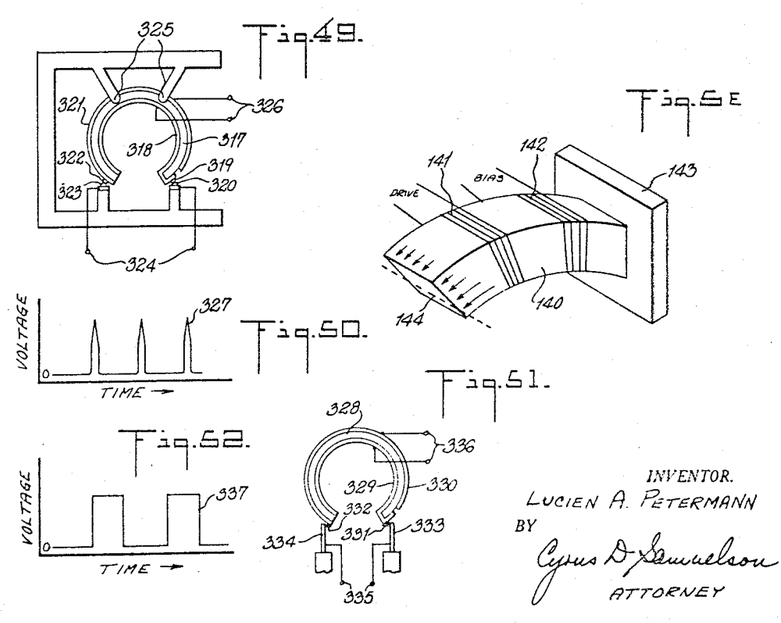

In FIGURE 5E, magnetostrictive transducer 140 is of homogeneous material and is suitably affixed to substantially rigid body 143. The driving winding is designated by 141, the bias winding is designated by 142 and the neutral axis is designated by 144. The driving dynamic instantaneous field is as indicated by the arrows in the figure and transducer 140 will vibrate in flexural mode.

FIGURE 6 serves to illustrate the positions of the neutral line, neutral surface, and neutral axis with respect to the direction of flexure. The numeral 130 designates the neutral line, the numeral 131 designates the neutral surface, the numeral 132 designates the neutral axis, the numeral 133 designates a substantially rigid body to which transducer 129 is suitably affixed and the numeral 134 designates the direction of flexure. Transducers produced according to my invention need not be rigidly attached at any particular point but may be suitably held at many different points without adversely affecting the operation of the transducers in electro-mechanical flexural vibration.

In FIGURES 7A and 7B, fields 145 and 146 are not homogeneous and are not symmetrical about their respective neutral axes 145$a$ and 146$a$ and, therefore, flexure can be produced with only two electrodes in transducers of homogeneous material and of such cross-sections and applied field distributions. Field 147, shown in FIGURE 7C, is homogeneous and symmetrical about neutral axis 147$a$ and, therefore, flexure cannot be produced by electro-mechanical means in a homogeneous transducer of this cross-section and driving field distribution if only two electrodes are employed. Field 148, shown in FIGURE 7D, is not homogeneous but it is symmetrical about neutral axis 148a and, therefore, flexure cannot be produced by electro-mechanical means in a homogeneous transducer of this cross-section and driving field distribution if only two electrodes are employed.

My invention is concerned with obtaining non-homogeneous distribution of the applied driving dynamic field and its non-symmetrical distribution about the neutral axis so that transducers of homogeneous material may be caused to vibrate in flexural mode with only two driving electrodes or a single excitation winding. No matter how the driving dynamic field distributions (electric or magnetic) are obtained, flexural vibration will be obtained by electro-mechanical means as long as the necessary and sufficient conditions of non-homogeneity of field distribution and non-symmetry about the neutral axis are fulfilled. The driving dynamic field distributions illustrated throughout the drawings are instantaneous field distributions which vary in accordance with the alternating voltage applied. However, if the instantaneous field distribution satisfies the requirements of flexure at any one instant, it will satisfy the conditions at all instants, the time and space dependence of such fields being independent functions which are multiplied in the steady state expression of these fields.

FIGURES 8, 9, 10 and 11 illustrate some embodiments of my invention as applied to piezoelectric or polarized electrostrictive transducers of homogeneous material. Transducer 149 will flex in the directions indicated by arrow 154 if an alternating voltage is applied across terminals 152 and 153 which are electrically connected to electrodes 150 and 151 respectively. The triangular cross-section is illustrative of the method of obtaining a non-homogeneous distribution of the applied dynamic driving field which is non-symmetrical about the neutral axis of the transducer. Other cross-sectional shapes such as regular and irregular polygons and non-symmetrical curved shapes of various curvatures may be employed equally effectively.

Figures 8, 9, 10, 11, 12, 13, 14, 15, 16, 17, 18:
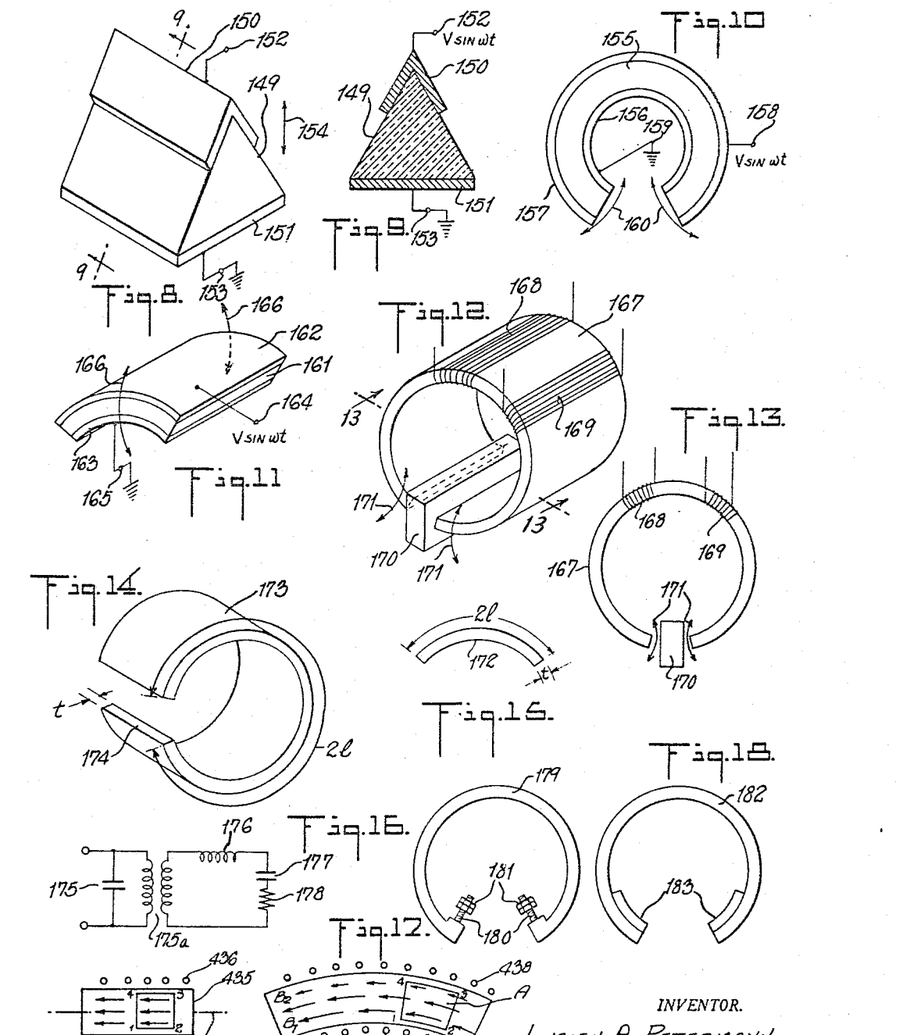
FIGURE 8 illustrates an embodiment of my invention.
FIGURE 9 is a section of the transducer of FIGURE 8 along the line 9—9.
FIGURES 10 and 11 illustrate further embodiments of my invention utilizing piezoelectric or polarized electrostrictive material.
FIGURE 12 illustrates my invention as embodied in a cylindrical magnetostrictive transducer.
FIGURE 13 is a section of the transducer of FIGURE 12 along the line 13—13.
FIGURES 14 and 15 are employed to explain the theory and operational characteristics of transducers produced according to my invention.
FIGURE 16 is an illustration of the equivalent electrical circuit of transducers produced in accordance with my invention.
FIGURE 17 illustrates a method of lowering and continuously adjusting the resonant frequency of transducers produced in accordance with my invention.
FIGURE 18 illustrates a further method of lowering the resonant frequency of transducers produced in accordance with my invention.

I choose to define transducers of the type depicted by transducer 155 of FIGURE 10 as split cylinders, a split cylinder being a cylinder with a small portion parallel to the longitudinal axis removed. Transducer 155 will vibrate in flexural mode in the directions indicated by arrows 160 if an alternating voltage is applied across terminals 158 and 159 which are electrically connected to electrodes 156 and 157 respectively.

Transducer 161, which is a segment of a cylinder, will vibrate in flexural mode in the directions indicated by arrows 166 if an alternating voltage is applied across terminals 164 and 165 which are electrically connected to electrodes 162 and 163 respectively. Transducer 161 may also be considered as a split cylinder and it is possible to drive it in a flexural vibration wherein the displacements are distributed in the manner depicted in FIGURE 10. Portions of other types of curved surfaces will vibrate in similar fashion to that described for transducer 161.

Conversely, since all transducers are electro-mechanical devices, an alternating voltage will be developed across the terminals which are electrically connected to the electrodes when a mechanical stress is applied in the direction of flexural vibration. The time dependence of the alternating voltage, thus produced, is determined by the time dependence of the mechanical flexure, just as the time dependence of mechanical flexure is determined by the time dependence of the applied voltage.

Transducer 167 is a split cylinder of the magnetostrictive type with driving winding 168 and bias winding 169. Numeral 170 designates a block of high permeability magnetic material which is employed to close the magnetic circuit, that is, to decrease the reluctance of the circuit. A direct-current biasing current is caused to flow through 169 and transducer 167 will vibrate in flexural mode in the directions indicated by arrows 171 when an alternating current is made to flow through winding 168. Conversely, so long as the bias current is maintained, an alternating current will flow in winding 168 when a vibrating mechanical force is applied to transducer 167 in the direction of arrows 171.

As I have stated previously, my invention applies to transducers of the piezoelectric, polarized electrostrictive and magnetostrictive types and the illustration of a particular shape in one of the types but not in the others does not mean that the other types may not be produced in that particular shape. It should be clearly understood that transducers of all these types may be made in all the shapes discussed. While it is not necessary to the operation of my invention, it should be noted that in all the cases discussed the material comprising the transducer is completely uniform and homogeneous. The necessary and sufficient conditions for vibration in flexural mode with only two driving electrodes or a single driving winding apply when the material of the transducer is uniform and homogeneous. If the material is non-homogeneous, the conditions may be sufficient but not necessary.

In order to further explain the theory underlying my invention, it is advisable to consider transducer 172 of FIGURE 15 which has a length equal to $2l$ and a thickness to $t$. Assume that the curve along $2l$ is smooth, that the cross-section is the same throughout the transducer and that $2l$ is greater than $t$. Then the resonant frequencies in flexural mode $f$ are given by the expression:

$$C = \frac{z^2}{2\pi l^2} \sqrt{\frac{EI}{\rho S}}$$

where $z$ = number depending on the harmonic considered and the type of support of the transducer ($z=2.635$ for the fundamental flexural mode with the transducer unclamped)
$E$ = Young's modulus of the material being used
$I$ = moment of inertia of the cross-section with respect to the neutral axis of the cross-section
$\rho$ = specific gravity
$l$ = half the length of the flexing transducer
$s$ = cross-section of the flexing transducer.

For a given mode (either fundamental or harmonic) and a given material, $z$, $E$, and $\rho$ are constants and $I=k^2S$, where $k$ is the radius of gyration, we obtain the expression:

$$F = \text{constant} \sqrt{\frac{k^2S}{Sl^4}} = \text{constant} \frac{k}{l^2}$$

or $$F\frac{l^2}{k} = \text{constant}$$

In the case shown in FIGURE 14, in which transducer 173 is a split cylinder or in any other case in which the cross-section 174 is a rectangle, we obtain the expression:

$$k = \frac{t}{\sqrt{12}}$$

where $t$ is the cylinder wall thickness; from which $$F\frac{l^2}{t} = \text{constant}$$

For barium titanate, the constant is found to be equal to approximately $1.10 \times 10^5$ cm./sec.

Therefore, for a given resonant frequency, an infinite number of values of $l$ and $t$ exist which will satisfy the equation. For example, given a barium titanate transducer of the split cylinder shape for which a flexural resonant frequency of 100 cycles per second is desired, substitution in the equation gives:

$$100\frac{l^2}{t} = 1.10 \times 10^5 \text{ or } \frac{l^2}{t} = 1.10 \times 10^3$$

and if $t=0.1$ cm.   $l=10.5$ cm.
$t=0.25$ cm.  $l=16.6$ cm.

and so forth.

FIGURE 16 shows the electrical equivalent circuit of a freely vibrating piezoelectric or polarized electrostrictive transducer, where numeral 175 represents the static capacitance of the transducer, 175a represents the electromechanical coupling, 176 represents the motional inductance, 177 the motional capacitance, and 178 the motional resistance. To match the transducer's equivalent electrical impedance to the electrical generator output impedance, it is useful to add an inductance in series or parallel with the transducer. This matching is especially useful in applications in which the transducer must be driven at relatively low voltage for large amplitudes of vibration.

Split cylinders have a very high figure of merit, Q, of the order of 1,000 to 3,000 at frequencies from 20 to 1,000 cycles per second. This is much higher than circuits, employing purely electrical components, yield at these low frequencies. The value of Q may be varied by clamping the transducer, or by adding mechanical loads, or by immersing all or part of the transducer in a liquid, or by increasing the friction or by similar means. The lowest value of damping is obtained when the transducer is clamped at the nodal surfaces and the electrode leads are connected on the nodal surfaces. The position of the nodal surfaces varies with the shape of the transducer and may be calculated from the particular solution of the differential equation of linear flexure corresponding to the particular mode and type of boundary conditions under study. The Q of a given transducer may be adjusted to almost any value between 0.5 and 3,000 (approximately). The resonant frequency for a given transducer of a particular material and dimensions will vary by approximately 15% at these extreme values of Q.

FIGURES 17 and 18 illustrate two methods of lowering the flexural mode resonant frequency of a given transducer. Transducer 179 has securely affixed thereto threaded elements 180 on which are threaded masses 181. The further away masses 181 are from transducer 179, the more the resonant frequency of the transducer's flexural mode is displaced from the original resonant frequency. The resultant resonant frequency is lower or higher than the original resonant frequency depending on the direction of threaded elements 180 with respect to the motion of transducer 179 in flexural vibration.

Transducer 182 has affixed thereto masses 183. These masses 183 are not adjustable and the flexural resonant frequency is likewise fixed. However, the frequency is lower than it would be if the same transducer were unloaded.

Figures 19, 20:
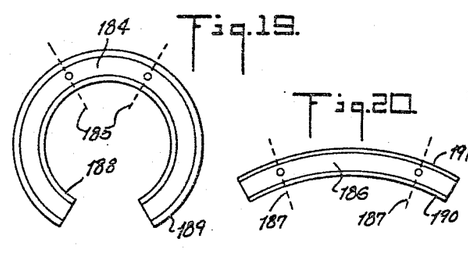
FIGURES 19 and 20 illustrate transducers produced in accordance with my invention.

Transducers 184 and 186 are produced according to my invention and will vibrate in flexural mode when driven by only two electrodes. In the case of 184, the electrodes are designated 188 and 189 and in the case of 186, the electrodes are designated 190 and 191. The nodal surfaces of transducer 184 are designated by numeral 185 and those for transducer 186 are designated by numeral 187.

Figure 21:
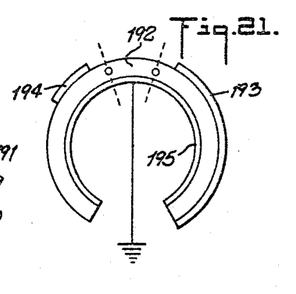
FIGURE 21 illustrates an embodiment of my invention which may be employed as the resonant element of a low frequency oscillator (this transducer may be of the tunable type)

Transducer 192 may be employed as the frequency control element of a low frequency oscillator. Numeral 193 designates the driving electrode, numeral 194 designates the feedback electrode and numeral 195 designates the electrode which is maintained at ground potential. The various methods of adjusting the resonant frequency of the flexural vibrations of the transducers which are described in this specification may be employed to adjust the frequency of transducers of the type of transducer 192.

Figure 22:
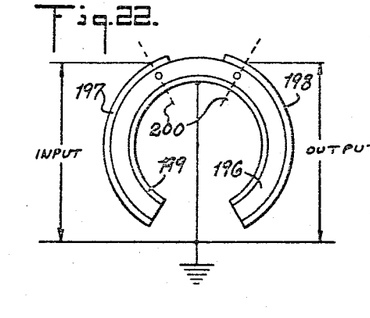
FIGURE 22 illustrates a transducer produced in accordance with my invention, employed as a band-pass filter (this transducer may be of the tunable type)
Figure 23:
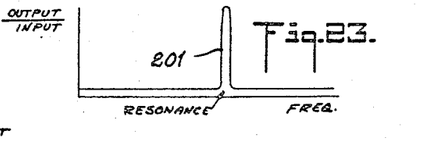
FIGURE 23 illustrates the characteristic frequency response of the filter of FIGURE 22.

Transducer 196 is shown connected to serve as a bandpass filter wherein the input is applied between electrodes 197 and 199 and the output is obtained across electrodes 198 and 199. Minimum damping and highest Q is obtained if the clamping of transducer 196 and the electrical leads for the input and output connections are accomplished at the nodal surfaces 200. Curve 201 is a typical output/input against frequency plot of the response of transducer 196.

Figure 24:
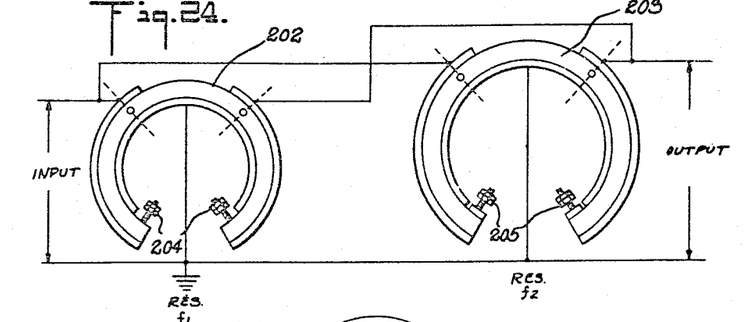
FIGURE 24 illustrates the employment of two transducers, produced in accordance with my invention, as a band-pass filter with adjustable band width.
Figure 25:
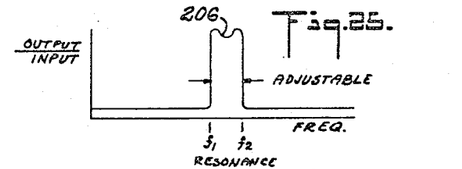
FIGURE 25 illustrates the characteristic frequency response of the filter of FIGURE 24.

Transducers 202 and 203 are shown connected as a band-pass filter with adjustable resonant frequencies. Masses 204 and 205 may be moved closer to or further away from transducers 202 and 203 in order to vary the resonant frequency of each transducer. Curve 206 is a typical output/input against frequency plot of the response of the combination of transducers connected as shown in FIGURE 24.

Figure 26:
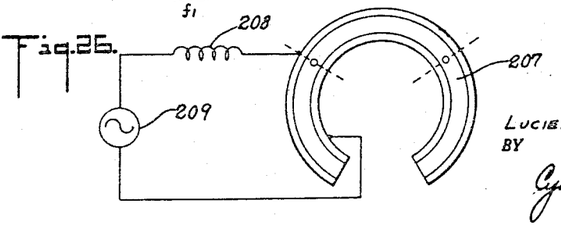
FIGURE 26 illustrates a transducer, produced in accordance with my invention, employed as a low-frequency, high-amplitude vibrator (this transducer may be of the tunable type)

Transducer 207 is shown connected as a low-frequency high-output vibrator. Coil 208 serves to balance out the static capacitance of transducer 207 and to match the equivalent electrical impedance of transducer 207 to the output impedance of generator 209 at the resonant frequency. The frequency of generator 209 is adjusted to the resonant frequency of the flexural mode at which we desire to have transducer 207 vibrate.

Figure 27:
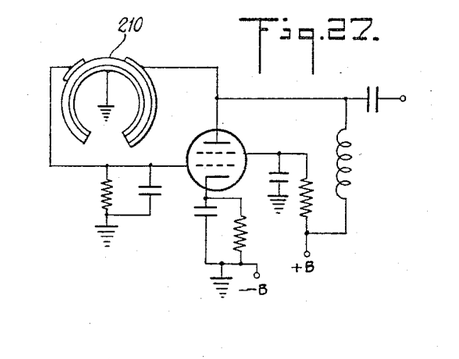
FIGURES 27 and 28 illustrate schematic diagrams of oscillator circuits in which transducers, produced in accordance with my invention, serve as the frequency control elements (these transducers may be of the tunable type)
Figure 28:
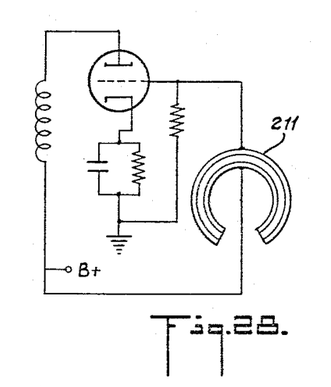

Transducers 210 and 211 are shown as the control elements of typical electronic oscillator circuits. Because of the low resonant frequency of these transducers in flexural mode, it is possible to obtain accurate frequency control at very low frequencies with simple electronic circuits, such as are shown in FIGURES 27 and 28.

Figures 29, 30, 31, 32:
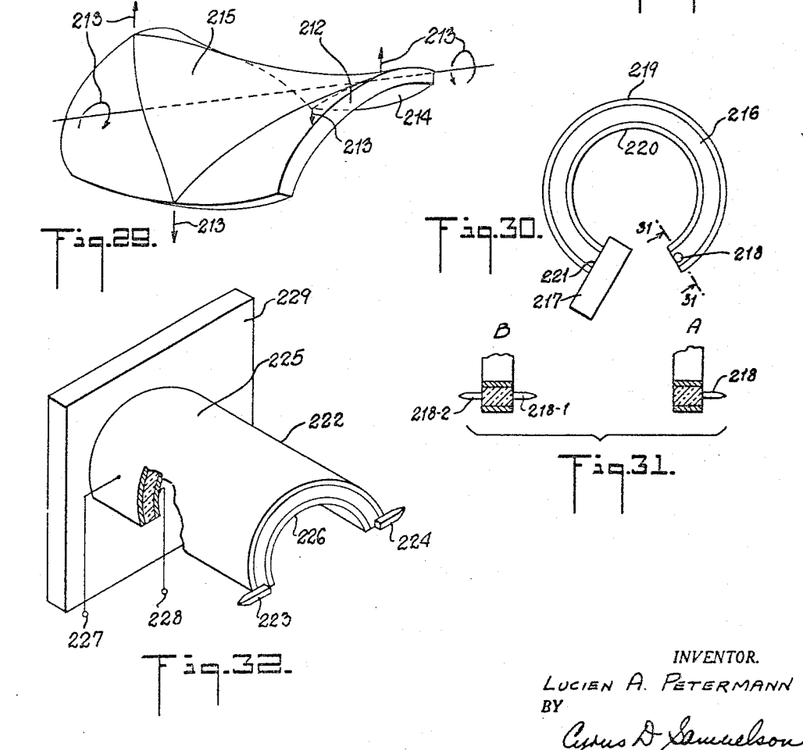
FIGURE 29 illustrates a twister type transducer, produced in accordance with my invention.
FIGURE 30 illustrates a transducer, produced in accordance with my invention, employed as the active element in a phonograph pickup.
FIGURE 32 is a further embodiment of my invention employed as a phonograph pickup.

Transducer 212 is a twister type transducer in which the flexural vibrations of all elementary portions and the shape of the transducer produce the twisting motion. Transducers of the type of transducer 212 are useful as microphone elements. The electrodes are applied to faces 214 and 215 and when an alternating voltage is applied between them, transducer 212 will vibrate as indicated by arrows 213.

Transducer 216 is a transducer, produced in accordance with my invention, employed as the active element in a phonograph pickup or cutter. One end of transducer 216 is clamped to substantially rigid body 217 so that when pickup needle 218 vibrates, a voltage appears across electrodes 219 and 220. Conversely, if a voltage is applied across electrodes 219 and 220, needle 218 will vibrate in accordance with the time dependence of the applied voltage. FIGURE 31A illustrates a single type pickup or cutter needle 218 and FIGURE 31B illustrates a dual type pickup needle which may be employed for use with phonograph records and transcriptions which require elements of different tip radius. When the dual pickup element, as illustrated in FIGURE 31B, is employed, transducer 216 is pivoted about point 221 so that either pickup needle 218–1 or 218–2 is in contact with the record groove or transcription groove which is to be reproduced by the system.

Transducer 222 is the active element in a dual needle type of phonograph or transcription pickup to which needles 223 and 224 have been suitably affixed. The combination is pivoted within clamp 229 so that the required needle is in contact with the record or transcription to be reproduced. Electrical output connections are made to terminals 227 and 228 which are electrically connected to electrodes 225 and 226 respectively.

Figure 33:
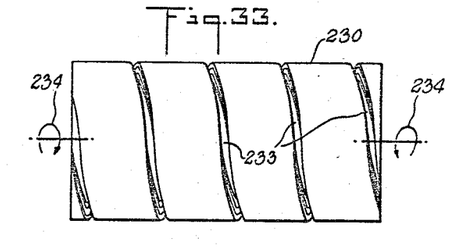
FIGURE 33 is a plan view and FIGURE 34 is an end view of a torsional type transducer which is produced in accordance with my invention and which requires only two driving electrodes.
Figure 34:
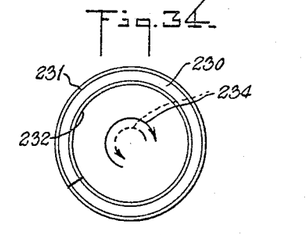

Transducer 230 is a torsional type transducer in the shape of a cylinder with electrodes 231 and 232 on the surfaces of said transducer and a helix 233 cut along the surface of 230. When an alternating voltage is applied across electrodes 231 and 232, transducer 230 will twist in the directions indicated by the arrows 234.

Figure 35:
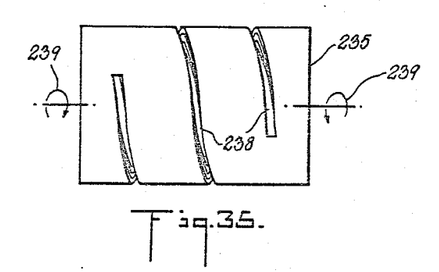
FIGURE 35 is a plan view and FIGURE 36 is an end view of a further embodiment of torsional type transducer which is produced in accordance with my invention which is produced in accordance with my invention and which requires only two driving electrodes.
Figure 36:
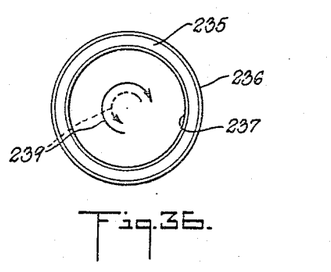

Transducer 235 is similar to transducer 230 except that helix 238, which is cut in transducer 235, does not extend along the whole length of transducer 235. If an alternating voltage is applied between electrodes 236 and 237, transducer 235 will twist in the directions indicated by arrows 239.

Figure 37:
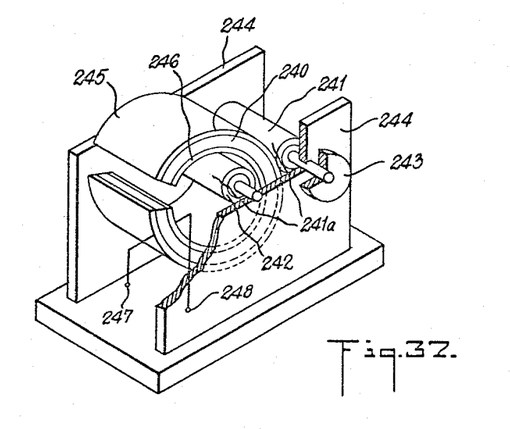
FIGURE 37 illustrates a transducer with a continuously adjustable resonant frequency which is produced in accordance with my invention and which may be employed as the tunable element in oscillators, filters, vibrators and like devices.

Transducer 240 is a tunable very low frequency resonant element which may be employed in all applications which require a tunable element. Transducer 240 is clamped between rollers 241 and 242 which are suitably fixed in holder 244. Rollers 241 and 22 are coated with a material 241a, the stiffness of which is chosen to permit obtaining the mechanical Q which is desired. This coating material may be made electrically conductive or it may be insulating, according to the requirements. If they are conductive, they may be used for the electrical connections to electrodes 245 and 246 with which they are in contact. The clamping action of rollers 241 and 242 fixes the nodal lines at their line of contact with transducer 240 and this in turn, fixes the resonant frequency, as determined by the distance between the lines of clamping and the free ends of transducer 240. By adjusting knob 243, the position of clamping is shifted on transducer 240 which moves between rollers 241 and 242, and thus, the resonant frequency is adjusted. External electrical connections are made (when 241a is of insulating material) to terminals 247 and 248 which are electrically connected to electrodes 245 and 246, respectively.

Figures 38, 39:
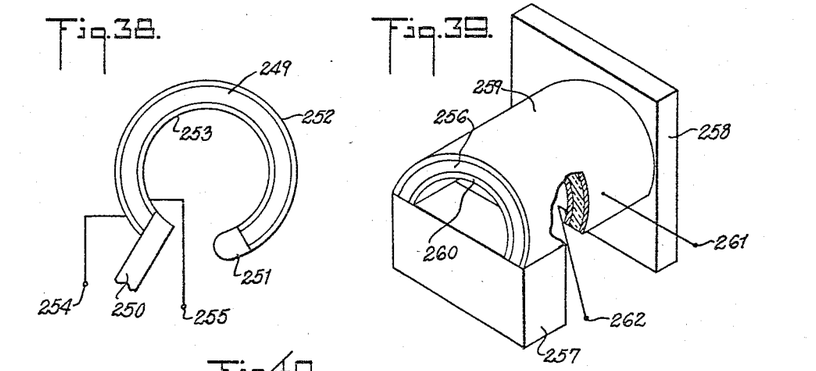
FIGURES 38 and 39 illustrate embodiments of my invention employed as the active elements in accelerometers.

Transducer 249 is the active element in an accelerometer or strain gauge. Mass 251 is applied to one end of 249 and the other end is clamped to substantially rigid body 250. In some applications, mass 251 is not required, in which case the mass of the transducer 249 itself serves as the inertial element. External electrical connections are made to terminals 254 and 255 which are electrically connected to electrodes 252 and 253, respectively.

Transducer 256 is the active element in an accelerometer, strain gauge or pressure gauge. Mass 257 is affixed to one end of transducer 256 while the other end is suitably clamped to substantially rigid body 258. External connections are made to terminals 261 and 262 which are electrically connected to electrodes 259 and 260, respectively.

Figure 40:
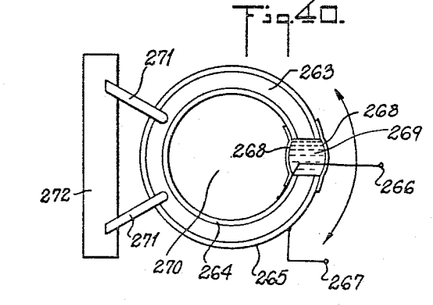
FIGURE 40 illustrates a transducer, produced in accordance with my invention, employed as the active element in a hydrophone.

Transducer 263 is a subaqueous hydrophone or projector. Electrodes 264 and 265 are respectively connected to terminals 266 and 267 to which the outside electrical connections are made. Membranes 268 serve to contain liquid 269 which is employed to damp the vibration of 263. In some applications, only a single membrane is required, in which case, it serves to prevent the outer liquid from entering the transducer. The numeral 270 designates an air space which is sealed from the outer liquid by membranes 268 and at both ends of 263. Clamps 271 are applied to transducer 263 along the nodal surfaces and are suitably affixed to substantially rigid body 272.

Figure 41:
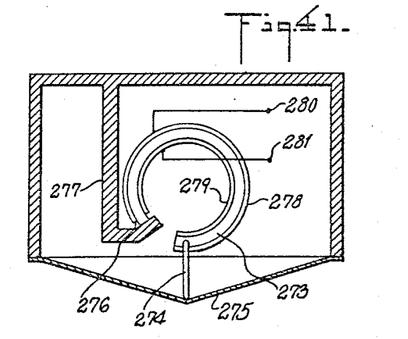
FIGURE 41 illustrates a microphone utilizing a transducer, produced in accordance with my invention, as the active element therein.

Transducer 273 is the active element of a microphone. One end of 273 is attached to pin 274 which in turn is attached to diaphragm 275. The other end of 273 is clamped at point 276 to housing 277. When sound waves strike diaphragm 275, pin 274 causes transducer 273 to vibrate in flexural mode and an electrical voltage appears across terminals 280 and 281 which are electrically connected to electrodes 278 and 279, respectively. Conversely, the same embodiment may be employed as a loudspeaker or tweeter. In which case, the application of alternating voltage at audio frequencies across terminals 280 and 281 will cause diaphragm 275 to vibrate at audio frequencies.

Figure 42:
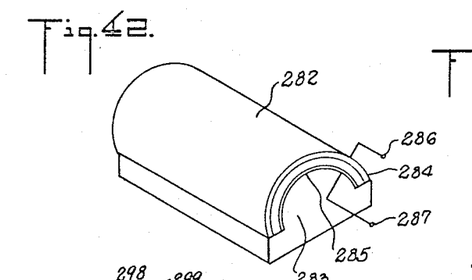
FIGURE 42 illustrates a transducer, produced in accordance with my invention, which may be employed as the active element in a microphone, hydrophone, projector, loudspeaker or tweeter.

Transducer 282 in the embodiment illustrated may be employed as a microphone, hydrophone, projector, loudspeaker or tweeter. The numeral 283 designates an acoustic isolator such as cork, corprene or like material which serves to prevent transmission or reception of sound in the inner portion of the transducer 282. Electrical connections are made to terminals 286 and 287 which are electrically connected to electrodes 284 and 285, respectively.

Figure 43:
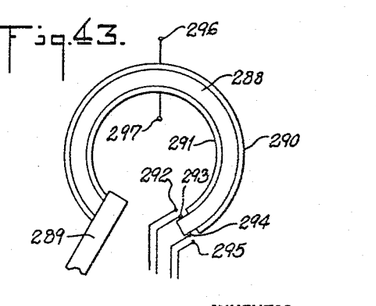
FIGURES 43 and 44 illustrate the employment of transducers, produced in accordance with my invention, as relays or vibrators.

Transducer 288 is illustrated as a relay wherein terminals 293 and 294 are rigidly attached to one end of 288 and make contact with terminals 292 and 295 during flexure. When contact is closed between terminals 292 and 293, it is open between 294 and 295 and vice versa. Transducer 288 is caused to flex by the application of a voltage across terminals 296 and 297 which are electrically connected to electrodes 290 and 291 respectively. The end of transducer 288 carrying terminals 293 and 294 will have the maximum displacement amplitude because the other end is suitably affixed to substantially rigid body 289.

Figure 44:
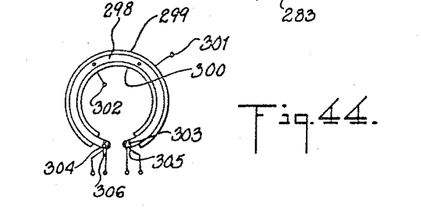

Transducer 298 is a relay which closes two circuits when it is flexed in one direction and opens the circuits when it is flexed in the opposite direction. Transducer 298 is caused to flex when a voltage is applied across terminals 301 and 302 which are electrically connected to electrodes 299 and 300, respectively. When transducer 298 flexes outward, contacts 303 and 305 are electrically connected and contacts 304 and 306 are electrically connected. When the transducer 298 flexes inward, the contacts are broken and the circuits are opened. More than two sets of contacts may be opened and closed in this manner since a plurality of such contacts may be affixed to the transducer along the flexing cross-section. The relays depicted in FIGURES 43 and 44 may be operated with either a D.C. or an A.C. voltage. The maximum amplitude of displacement is attained when the A.C. frequency is equal to the transducer's flexural resonant frequency.

Figure 45:
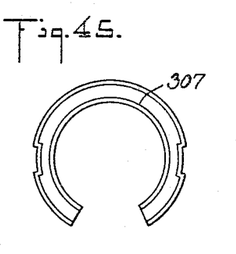
FIGURES 45, 46 and 47 illustrate methods of lowering the resonant frequency of transducers produced in accordance with my invention.
Figure 46:
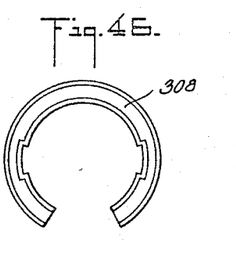
Figure 47:
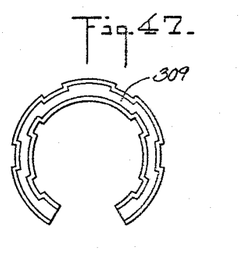

Transducers 307, 308, and 309 are illustrative of various methods of increasing the mass-compliance of transducers of given dimensions in order to lower the resonant frequencies. These transducers may be employed as the active elements in any of the applications for which the transducers contemplated by my invention may be used.

Figure 48:
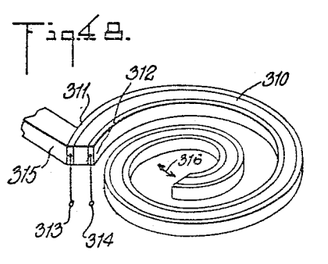
FIGURE 48 illustrates a further embodiment of my invention wherein the displacement of the free end of the transducer is large for a given driving voltage input.

Transducer 310 is clamped to substantially rigid body 315 and will flex in the directions indicated by arrow 316 when a voltage is applied across the terminals 313 and 314 which are electrically connected to electrodes 311 and 312, respectively. The motion will be of particularly large amplitude for transducers of small dimensions.

Transducer 317 is clamped at its nodal surfaces 325 and is employed as a chopper. The time dependence of its output waveform across terminals 326 is illustrated by curve 327. Curve 327 is typical of the output when a direct-current voltage is applied across terminals 324. With no voltage applied to terminals 324, terminal 319, which is bonded to electrode 318, is in contact with terminal 320, and terminal 322, which is bonded to electrode 321, is in contact with terminal 323. When a direct-current voltage of the proper polarity is applied across terminals 324, the transducer 317 flexes inward and breaks the contacts between terminals 319 and 320 and between terminals 322 and 323. After the charge is removed because of current flow in the circuit associated with terminals 326, the transducer 317 returns to its original position and the cycle starts again.

Transducer 328 is a chopper with electrodes 329 and 330. Terminals 331 and 332 are bonded to electrodes 329 and 330, respectively. In the unflexed position, terminals 331 and 332 are in contact with spring contacts 333 and 334 respectively. When a direct-current voltage of the proper polarity is applied to terminals 335, spring contacts 333 and 334 remain in contact with terminals 331 and 332 for a longer period than if the contacts 333 and 334 were not on springs and the consequent output waveform across terminals 336 is of the shape shown by curve 337. After the contact between 333 and 331 and between 332 and 334 is broken, the charge is removed from transducer 328 because of the current flow in the electrical circuit associated with terminals 336 and transducer 328 returns to its original position and the cycle starts again.

While I have described my invention by means of specific examples and in specific embodiments, I do not wish to be limited thereto for obvious modifications will occur to those skilled in the art without departing from the spirit and scope of the invention.

Having thus described my invention, I claim:

1. A transducer comprising a homogeneous electro-mechanically sensitive body, said body being a hollow cylinder carrying a slit therein parallel to the axis of said cylinder, the surfaces forming the sides of said slit being substantially uniform in cross-section, at least one electric coil, and retaining means in the surfaces of said cylinder for receiving said coil.

2. A transducer comprising an electro-mechanically sensitive body, said body being a hollow cylinder and carrying a helical slit therein, said slit traversing the surface of said cylinder, each end of said slit being spaced from the end of said cylinder adjacent thereto, and means for making electrical connection to said transducer.

3. A transducer as described in claim 2 wherein the material comprising said electro-mechanically sensitive body is homogeneous.

4. A transducer as described in claim 2 wherein the material comprising said electro-mechanically sensitive body is a homogeneous ceramic.

5. A transducer comprising an electro-mechanically sensitive body, said body being a hollow cylinder and carrying a helical slit therein, said slit traversing the surface of said cylinder, one end of said slit being spaced from the end of said cylinder adjacent thereto, and means for making electrical connection to said transducer.

6. A transducer as described in claim 5 wherein the material comprising said electro-mechanically sensitive body is homogeneous.

7. A transducer as described in claim 5 wherein the material comprising said electro-mechanically sensitive body is a homogeneous ceramic.

8. A transducer comprising an electro-mechanically sensitive body, said body being a hollow cylinder and carrying a helical slit therein, said slit traversing the surfacing of said cylinder, each end of said slit coinciding with one end of said cylinder, and means for making electrical connection to said transducer.

9. A transducer as described in claim 8 wherein the material comprising said electro-mechanically sensitive body is homogeneous.

10. A transducer as described in claim 8 wherein the material comprising said electro-mechanically sensitive body is a homogeneous ceramic.

11. A transducer comprising an electro-mechanically sensitive body, said body being a hollow cylinder carrying a slit therein parallel to the axis of said cylinder, the surfaces forming the sides of said slit being substantially uniform in cross-section, a first resilient roller in contact with the inner surface of said body, a second resilient roller in contact with the outer surface of said body, holding means supporting said rollers, controlling and adjusting means for adjusting the position of said cylindrical body with respect to said rollers, and means for making electrical connections to the surfaces of said cylindrical body.

12. A transducer comprising an electro-mechanically sensitive body, said body being spiral in shape in its long dimension and planar in its short dimensions, a supporting member, one end of said spiral body being affixed to said supporting member, and means for making electrical connections to the curved surfaces of said body.

13. A transducer as described in claim 12 wherein the material comprising said electro-mechanically sensitive body is homogeneous.

14. A transducer as described in claim 12 wherein the material comprising said electro-mechanically sensitive body is a homogeneous ceramic.

15. An audio transducer comprising a housing, an electro-mechanically sensitive body, said body being a hollow cylinder carrying a slit therein parallel to the axis of said cylinder, the surfaces forming the sides of said slit being substantially uniform in cross-section, a diaphragm, said body being affixed to said housing along one of the surfaces forming one of the sides of said slit, said body being mechanically connected to said diaphragm adjacent the side of said slit opposite said side affixed to said housing, and means for making electrical connections to said body.

16. A transducer comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, said body being mechanically displaced in a flexural mode upon the application of an electrical signal to the electrodes.

17. A transducer comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, said body producing electrical signals at said electrodes upon mechanical displacement of said body in a flexural mode.

18. A transducer comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said body with at least one of the side edges thereof free to move, said body being mechanically displaced in a flexural mode, upon the application of an electrical signal to the electrodes, to flex said at least one of said side edges inwardly and outwardly.

19. A transducer comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said body with at least one of the side edges thereof free to move, said body producing electrical signals at said electrodes upon mechanical displacement of said body in a flexural mode by moving said at least one of said side edges inwardly and outwardly.

20. A transducer comprising an electro-mechanically sensitive body, said body being a partial hollow cylinder of piezoelectric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, said body being mechanically displaceable in a flexural mode about nodal points in the body, means for mounting said body adjacent said nodal points with the side edges of the body free to move, said body being mechanically displaced in a flexural mode, upon the application of an electrical signal to the electrodes, to flex said side edges inwardly and outwardly.

21. A transducer comprising an electro-mechanically sensitive body, said body being a partial hollow cylinder of piezoelectric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, said body being mechanically displaceable in a flexural mode about nodal points in the body, means for mounting said body adjacent said nodal points with the side edges of the body free to move, said body producing electrical signals at said electrodes upon mechanical displacement of said body in a flexural mode by moving said side edges inwardly and outwardly.

22. A transducer comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said body adjacent one of the side edges thereof with the other side edge thereof free to move, said body being mechanically displaced in a flexural mode, upon the application of an electrical signal to the electrodes, to flex the free side edge inwardly and outwardly.

23. A transducer comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said body adjacent one of the side edges thereof with the other side edge thereof free to move, said body producing electrical signals at said electrodes upon mechanical displacement of said body in a flexural mode by moving the free side edge inwardly and outwardly.

24. A transducer comprising an elongated electro-mechanically sensitive body, said body being a partial hollow cylinder of piezo-electric ceramic with the inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said elongated body with at least one of the ends thereof free to move, said elongated body being mechanically displaced in a flexural mode, upon the application of an electrical signal to the electrodes, to flex said at least one of said ends thereof laterally towards the concave and convex surfaces thereof.

25. A transducer comprising an elongated electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said elongated body with at least one of the ends thereof free to move, said elongated body producing electrical signals at said electrodes upon mechanical displacement of said body in a flexural mode by moving said least one of said ends thereof laterally towards the concave and convex surfaces thereof.

26. A transducer comprising an elongated electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said elongated body adjacent one end thereof with the other end thereof free to move, said elongated body being mechanically displaced in a flexural mode, upon the application of an electrical signal to the electrodes, to flex the free end thereof laterally towards the concave and convex surfaces thereof.

27. A transducer comprising an elongated electro-mechanically sensitive body, said body being a partial hollow cylinder of piezo-electric ceramic with the inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said elongated body adjacent one end thereof with the other end thereof free to move, said elongated body producing electrical signals at said electrodes upon mechanical displacement of said body in a flexural mode by moving the free end thereof laterally towards the concave and convex surfaces thereof.

28. A transducer for a phonograph comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said body, and a stylus affixed to the body for mechanically displacing said body in a flexural mode for producing electrical signals at said electrodes in accordance with the flexing of the body by the stylus.

29. A transducer for a phonograph comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said body adjacent one of the side edges thereof, and a stylus affixed to the body adjacent the other side edge thereof for mechanically displacing said body in a flexural mode for producing electrical signals at said electrodes in accordance with the flexing of the body by the stylus.

30. A transducer for a phonograph comprising an elongated electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said elongated body adjacent one end thereof, and a stylus affixed to the elongated body adjacent the other end thereof for mechanically displacing said body in a flexural mode for producing electrical signals at said electrodes in accordance with the flexing of the body by the stylus.

31. An audio transducer comprising an electro-mechanically sensitive body, said body being a partial hollow cylinder of piezo-electric ceramic with inner concave and outer convex substantially cylindrical surfaces, substantially straight parallel side edges and substantially arcuate ends, an electrode on the inner concave surface, an electrode on the outer convex surface, said body being polarized radially between the electrodes, means for mounting said body, means for applying electrical signals to said electrodes for displacing said body in a flexural mode, and a sound producing diaphragm connected to said body and vibrated by the flexing of said body.

References Cited in the file of this patent
UNITED STATES PATENTS

| | | |
|---|---|---|
| 1,750,124 | Pierce | Mar. 11, 1930 |
| 2,101,272 | Scott | Dec. 7, 1937 |
| 2,365,738 | Williams | Dec. 26, 1944 |
| 2,459,019 | D'Heedene | Jan. 11, 1949 |
| 2,515,446 | Gravely | July 18, 1950 |
| 2,719,929 | Brown | Oct. 4, 1955 |
| 2,838,695 | Thurston | June 10, 1958 |